(12) United States Patent
Maurel

(10) Patent No.: US 7,091,488 B2
(45) Date of Patent: Aug. 15, 2006

(54) UNCOOLED OPTICAL IMAGING DEVICE

(75) Inventor: Gilles Maurel, Le Cannet (FR)

(73) Assignee: Alcatel, Paris (FR)

( * ) Notice: Subject to any disclaimer, the term of this patent is extended or adjusted under 35 U.S.C. 154(b) by 137 days.

(21) Appl. No.: 10/464,660

(22) Filed: Jun. 19, 2003

(65) Prior Publication Data

US 2004/0155195 A1 Aug. 12, 2004

(30) Foreign Application Priority Data

Jul. 15, 2002 (FR) ................... 02 08895

(51) Int. Cl.
*G01J 5/02* (2006.01)
(52) U.S. Cl. ............... 250/351; 250/338.1; 250/332
(58) Field of Classification Search .......... 250/351, 250/352, 330, 331, 332, 338.3, 338.1
See application file for complete search history.

(56) References Cited

U.S. PATENT DOCUMENTS

| | | | |
|---|---|---|---|
| 5,457,493 A | 10/1995 | Leddy et al. | |
| 5,512,748 A * | 4/1996 | Hanson | 250/332 |
| 5,519,206 A | 5/1996 | Uwira | |
| 5,596,185 A | 1/1997 | Bross et al. | |
| 6,066,850 A * | 5/2000 | Hersom et al. | 250/342 |
| 6,583,416 B1 * | 6/2003 | Villani | 250/332 |
| 6,586,738 B1 * | 7/2003 | Dausch et al. | 250/338.3 |
| 2005/0082480 A1 * | 4/2005 | Wagner et al. | 250/338.1 |

* cited by examiner

*Primary Examiner*—David Porta
*Assistant Examiner*—Faye Boosalis
(74) *Attorney, Agent, or Firm*—Sughrue Mion, PLLC

(57) ABSTRACT

Optical sensors, more particularly infrared sensors, use an array of MEM micromirrors to chop a light beam impinging on an array of sensors of an imaging device to minimize the influence of thermal noise. The array of micromirrors preferably switches the beam impinging on the array of sensors between an image to be analyzed and an image of a reference black body at a clearly defined temperature. These sensors are not cooled and require no cryogenic devices.

18 Claims, 1 Drawing Sheet

UNCOOLED OPTICAL IMAGING DEVICE

CROSS-REFERENCE TO RELATED APPLICATIONS

This application is based on French Patent Application No. 02 08 895 filed Jul. 15, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to optical imaging devices, preferably devices operating in the infrared band, that are not cooled. This kind of imaging device is more particularly intended for use in a video camera or a telescope to form an image outside the visible band. This kind of device is sometimes referred to as an infrared focal plane.

2. Description of the Prior Art

As with any sensor, one of the main qualities required of an optical imaging device is to be able to deliver a signal of sufficient amplitude compared to the inherent noise of the device. Referring more particularly to infrared imaging devices, the most serious form of noise is usually the inherent thermal noise of the device, caused by the ambient temperature to which the device is exposed. To illustrate the importance of this effect, note that the normal human temperature of 37° C. corresponds to an infrared wavelength of substantially 10 micrometers.

The solution most widely used for reducing this noise consists in cooling the imaging device to a temperature corresponding to a wavelength outside the spectral domain to be imaged.

The devices used to obtain such cooling are bulky and expensive. They also introduce serious limitations on the dimensions of the imaging device and/or the cryogenic device and in some cases have a prohibitive power consumption. The simplest solution, which consists in using cooling by expansion of a gas contained in a pressurized cylinder, although it simplifies the production of the cryogenic device, leads to a considerable consumption of gas and is in practice essentially reserved for single-use devices, such as imaging devices in missiles.

In the case of a video camera generating successive frames, dispensing with a cooling device by using an array of thermocouples or an array of bolometers in combination with a device for chopping the signal between two successive frames has been envisaged. This produces the wanted signal, or at least a signal that is less degraded, by subtracting the noise from the total signal. However, this method has the drawback of not providing a reference signal, which degrades the accuracy of the measurements as a function of the temperature of the device.

Also known in the art are bolometer devices that dispense with chopping of the signal. However, these devices have a temperature drift such that they cannot be used for radiometric measurements.

SUMMARY OF THE INVENTION

To obtain an optical imaging device that is not cooled but has adequate characteristics, the invention proposes an optical imaging device that is not cooled and in which an optical image is transported onto an array of optical sensors and an array of MEM micromirrors is inserted into the transfer optical path outside locations of intermediate images to chop the light beam infringing on the array of sensors.

According to another feature, the array of micromirrors is disposed in the vicinity of a real pupil.

According to another feature, the array of micromirrors when in a first state directs onto the array of sensors an image to be analyzed and when in a second state directs onto the array of sensors an image of a black body at a clearly defined temperature.

According to another feature, the array of micromirrors when in a plurality of separate states directs onto said array of sensors images of a plurality of separate black bodies having different characteristics.

According to another feature, the device includes a plurality of arrays of micromirrors associated side by side.

According to another feature, the device includes an afocal optical system for associating an entry image, an array of micromirrors, and an array of analyzers with different dimensions.

According to another feature, the entry image and the array of sensors have substantially equal dimensions and the array of micromirrors has linear dimensions substantially twice those of the sensor and the entry image.

Other features and advantages of the invention become clearly apparent in the course of the following description, which is given by way of nonlimiting example and with reference to the accompanying drawings.

DETAILED DESCRIPTION OF THE PREFERRED EMBODIMENT

Figure 1:
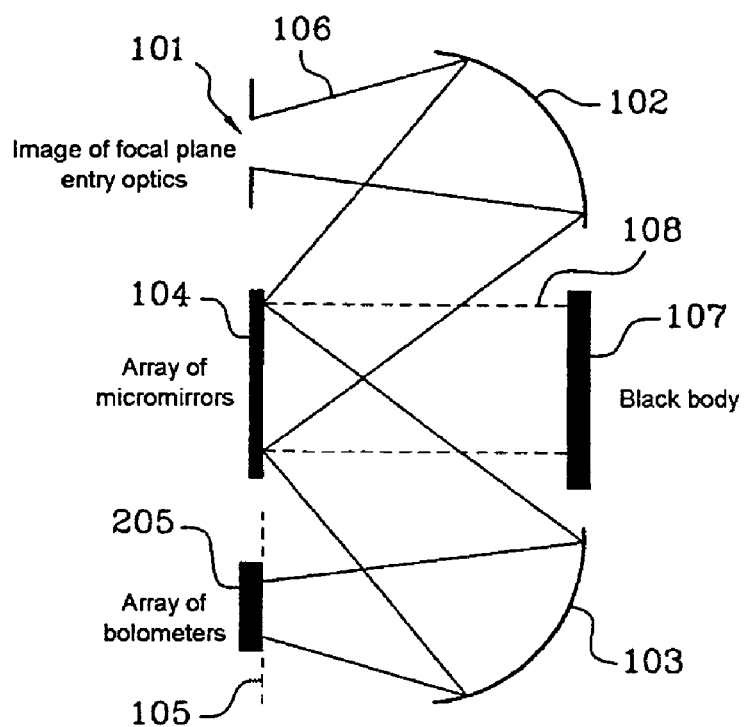
FIG. 1 is a diagrammatic view in section of one embodiment of an imaging device according to the invention.

In FIG. 1, the optical image to the analyzed is formed at the input 101 of an imaging device in accordance with the invention by an external device, not shown, that is known in the art.

Image transport optics of a type known in the art, in this example comprising two convex mirrors 102 and 103 and an intermediate plane mirror 104, transfer the image to a unit 105 for analyzing the image, for example an array of bolometers.

According to the invention, the intermediate plane mirror 104 of the transport optics takes the form of an array of micro-electrical-mechanism (MEM) mirrors. The array of micromirrors, which until now has been used mainly in video projectors, comprises a matrix of miniature mirrors whose inclinations can be controlled individually by electrical signals.

By commanding the inclination of the micromirrors, for example between two distinct states, the image can be formed on the array 105 in a first of these states, as in the case of an ordinary plane mirror, and moved away from this focal plane in a second state, which naturally eliminates the response of the array of bolometers to the light rays forming the image.

This chops the electrical signals at the output of the array 105, in a similar way to the chopping used in the prior art, but is achieved by purely optical means, which do not have the drawback associated with prior art electrical chopping systems.

The chopping is preferably effected between two successive frames delivered by the array 105.

In contrast to prior art devices using MEMs, such as the video projectors mentioned above, in which the MEMs are placed on a real intermediate image, the invention proposes to place the MEMs away from the locations of the intermediate images and preferably in the vicinity of a real pupil. In this way all, or at least most, of the rays of a light beam focused on one of the bolometers of the array 105 are globally affected by all (most) of the individual mirrors of the MEMs. Thus the individual actions of the micromirrors are averaged over the whole of the array 105, which eliminates the problems of variations of the individual mirrors, including the loss of a few of them.

The location of the MEMs in the vicinity of a real pupil is explained next with the aid of the FIGS. 2 and 3 diagrams.

Figure 2:
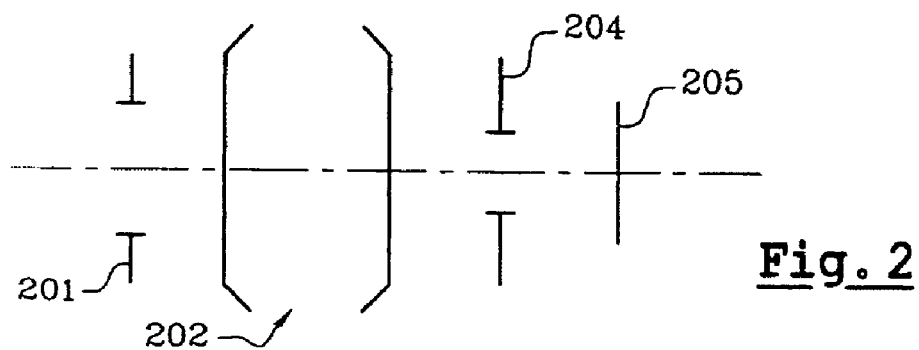
FIG. 2 is an explanatory diagram in section of an ordinary imaging device.

In FIG. 2, in which the invention is not applied, any kind of infrared optics 202 form an image on an array 205 of detectors, conjugating an entry pupil 201 and an exit pupil 204. The exit pupil 204 is real and is situated in front of the array of detectors.

Figure 3:
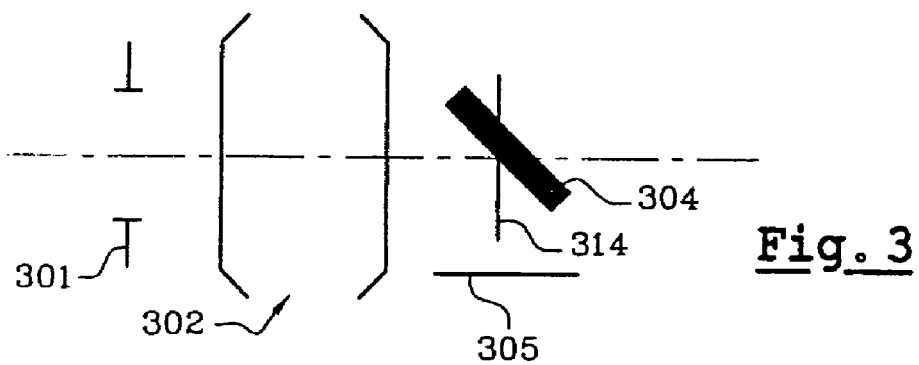
FIG. 3 is an explanatory diagram in section of the FIG. 2 imaging device modified in accordance with the invention.

In FIG. 3, in which the invention is applied, any kind of infrared optics 302 form an image on an array 305 of detectors after reflection from an array 304 of micromirrors. The array of micromirrors is inclined at 45° to the optical axis 302 and is positioned so that its center is at the center of the conjugate image of the entry pupil 301, situated in the plane 314 perpendicular to the optical axis and which, in the absence of the array 304, would form the real exit pupil of the system. Given the 45° inclination of the array 304, the latter can therefore not be conjugate with the inlet pupil 301, since only its center is situated at the location of the exit pupil, when present. However, the distance of the various micromirrors of the array from the ideal conjugate position is sufficiently small for excellent results to be obtained from the averaging process described above. The same would apply if the array of micromirrors were situated a little in front or a little behind the conjugate plane 314. This explains in what sense, according to the invention, the array of micromirrors is placed "in the vicinity" of a real pupil.

Given the usual dimensions of the optical systems delivering a basic image, the arrays of bolometers, and the arrays of micromirrors, the image transport optics are preferably of the afocal type having internal magnification followed by reduction. This allows the use of an array 104 of micromirrors available off the shelf, of the type used in video projectors, whose dimensions are much greater than those of the bolometer array 105, which can also be of an ordinary type. To minimize the effect of a number of aberrations a plurality of MEMs, for example four MEMs, could be used side by side in a common plane to increase the overall surface areas of the array of micromirrors. Once again, positioning this system in the vicinity of a real pupil eliminates edge effects at the junction of the MEMs.

To fix ideas, in one particular embodiment, the linear dimensions of the array of micromirrors are substantially twice those of the array of bolometers, the magnification between the entry pupil 101 and the array of micromirrors provided by the convex mirror 102 is substantially +2, and the magnification between the array 104 of micromirrors and the array 105 of bolometers provided by the convex mirrors 103 is substantially −2.

During frame scanning, the micromirrors are oriented to form an image of the entry pupil 101 on the array 105 of bolometers, along the geometrical path 106.

According to the invention, when the mirrors are oriented to deflect the light beam away from the array 105 of bolometers, they form on the array 105 an image of a black body 107 placed in such a manner, in this example between the convex mirrors 102 and 103 and just in front of the array 104 of micromirrors, that the image of a black body is formed on the surface of the array 105 along the geometrical path 108.

The black body is of the passive type and consists, for example, of a material whose emissive characteristics are well known and very close to those of an ideal black body. The material is chosen to have a high conductivity so as to remain at a very stable temperature. It includes measuring means, for example an NTC resistor, so that its temperature is known very accurately and thus likewise its emission characteristics.

The detector can therefore be calibrated continuously and thereby achieve a very high radiometric resolution.

If necessary, a plurality of separate black bodies can be used, addressable individually by modifying the orientation of the micromirrors, to have separate calibration points appropriately distributed over the response curve of the microbolometers.

Finally, in the event of saturation or underexposure of the detector, the cyclic ratio of exposure of the detector to the signal can be altered by modifying the cyclic ratio for orienting the micromirrors to return the operating parameters of the detector into a linear range of operation.

The invention therefore dispenses with devices, in particular cryogenic devices, having the drawbacks described above and whose failure, which could be relatively frequent because of the complexity of the system as a whole, would lead to a catastrophic result. Instead consumer grade devices that are widely used and available off the shelf are used, being very affordable and much more reliable than the prior art devices. In particular, the loss of a few micromirrors is of negligible importance compared to the quality of the image obtained, as explained above.

These characteristics mean that this kind of device can be used in an earth sensor installed on an artificial satellite placed in a supersynchronous orbit, for example.

As there is furthermore no wavelength limit on the bolometers or the micromirrors, it is also possible to use this configuration for imaging in the far infrared, i.e. at wavelengths beyond 10 micrometers.

There is claimed:

1. An optical imaging device that is not cooled and in which an optical image is transported along an optical path onto an array of optical sensors and an array of MEM micromirrors is inserted into said transfer optical path outside and downstream of intermediate images to chop the light beam impinging on said array of sensors.

2. The device claimed in claim 1 wherein said array of micromirrors is disposed in the vicinity of a real pupil.

3. The device claimed in claim 1 wherein said array of micromirrors when in a first state directs onto said array of sensors an image to be analyzed and when in a second state directs onto said array of sensors an image of a black body at a clearly defined temperature.

4. The device claimed in claim 3 wherein said array of micromirrors when in a plurality of separate states directs onto said array of sensors images of a plurality of separate black bodies having different characteristics.

5. The device claimed in claim 1 including a plurality of arrays of micromirrors associated side by side.

6. An optical imaging device that is not cooled and in which an optical image is transported along an optical path onto an array of optical sensors and an array of MEM micromirrors is inserted into said optical path outside locations of intermediate images to chop the light beam impinging on said array of sensors; and
wherein the imaging device further comprises an afocal optical system for associating an entry image, an array of micromirrors, and an array of analyzers with different dimensions.

7. The device claimed in claim 6 wherein said entry image and said array of sensors have substantially equal dimensions and said array of micromirrors has linear dimensions substantially twice those of said sensor and said entry image.

8. An optical imaging device, comprising:
an optical system that receives an image;
an array of micromirrors located on an optical path outside and downstream of intermediate images; and
an array of optical sensors located on the optical path downstream of the array of micromirrors and that receive radiation from the image;
wherein the optical system transports radiation from the image along a portion of the optical path through the optical system; and
wherein the array of micromirrors are controllable to chop the radiation.

9. The optical imaging device according to claim 8, wherein the optical system comprises infrared optics.

10. The optical imaging device according to claim 9, wherein the array of optical sensors comprises an array of bolometers.

11. The optical imaging device according to claim 10, wherein linear dimensions of the array of micromirrors are about twice linear dimensions of the array of bolometers.

12. The optical imaging device according to claim 9, wherein the device does not include a mechanism that actively cools the device.

13. The optical imaging device according to claim 9, further comprising an exit pupil and wherein the array of micromirrors are located in a vicinity of the exit pupil.

14. The optical imaging device according to claim 9, further comprising an exit pupil and wherein the array of micromirrors crosses a plane of the exit pupil.

15. The optical imaging device according to claim 9, wherein the device is a video camera that generates successive frames.

16. The optical imaging device according to claim 9, wherein the optics are of the afocal type that alters the size of a beam of radiation traveling through the optics.

17. An artificial satellite comprising a video earth sensor that includes the imaging device according to claim 9.

18. An optical imaging device, comprising:
an optical system that receives an image;
an array of micromirrors located on an optical path downstream of the optical system; and
an array of optical sensors located on the optical path downstream of the array of micromirrors and that receive radiation from the image;
wherein the optical system transports radiation from the image along a portion of the optical path through the optical system;
wherein the array of micromirrors are controllable to chop the radiation;
wherein the optical system comprises infrared optics;
wherein the array of optical sensors comprises an array of bolometers; and
wherein the array of micromirrors are located such that a majority of rays of the radiation focused on one bolometer of the array of bolometers are affected by a majority of the individual mirrors.

\* \* \* \* \*